United States Patent
Cohen et al.

(10) Patent No.: US 6,219,643 B1
(45) Date of Patent: Apr. 17, 2001

(54) METHOD OF ANALYZING DIALOGS IN A NATURAL LANGUAGE SPEECH RECOGNITION SYSTEM

(75) Inventors: Michael H. Cohen, Burlingame; Eric G Jackson, Menlo Park, both of CA (US); Vijaya L Kurada, Clifton Park, NY (US)

(73) Assignee: Nuance Communications, Inc., Menlo Park, CA (US)

( * ) Notice: Subject to any disclaimer, the term of this patent is extended or adjusted under 35 U.S.C. 154(b) by 0 days.

(21) Appl. No.: 09/105,837

(22) Filed: Jun. 26, 1998

(51) Int. Cl.$^7$ .............................. G10L 15/22; H04M 3/50

(52) U.S. Cl. ........................................ 704/257; 379/88.18

(58) Field of Search ................................... 704/257, 275; 379/88.04, 88.27, 75, 88.18

(56) References Cited

U.S. PATENT DOCUMENTS

| | | |
|---|---|---|
| 4,887,212 | 12/1989 | Zamora et al. . |
| 4,974,191 | 11/1990 | Amirghodsi et al. . |
| 5,003,574 * | 3/1991 | Denq et al. ...................... 379/88.01 |
| 5,442,780 | 8/1995 | Takanashi et al. . |
| 5,548,631 | 8/1996 | Krebs et al. . |
| 5,603,031 | 2/1997 | White et al. . |
| 5,608,624 | 3/1997 | Luciw . |
| 5,689,669 | 11/1997 | Lynch et al. . |
| 5,692,187 | 11/1997 | Goldman et al. . |
| 5,790,044 | 8/1998 | Lin et al. . |
| 5,860,059 * | 1/1999 | Aust et al. ............................ 704/231 |

FOREIGN PATENT DOCUMENTS 10079785   3/1998   (JP) .

OTHER PUBLICATIONS

Lennig et al., "Directory assistance automation in Bell Canada: trial results," Second IEEE Workshop on Interactive Voice Technology for Telecommunications Applications, Sep. 1994, pp. 9 to 12.*

Aust et al., "Evaluating dialog systems used in the real world," Proceedings of the 1998 IEEE International Conference on Acoustics, Speech and Signal Processing, vol. 2, May 1998, pp. 1053 to 1056.*

Kitai et al., "The evaluation of trial results for a voice activated telephone intermediary system," Second IEEE Workshop on Interactive Voice Technology for Telecommunications Applications, Sep. 1994, pp. 133 to 136.*

Carlson et al., "Application of speech recognition technology to ITS advanced traveler information systems," Vehicle Navigation and Information Systems Conference, Aug. 1995, pp. 118 to 125.*

Bennacef et al., "Dialog in the RAILTEL telephone–based system," Fourth International Conference on Spoken Language, vol. 1, Oct. 1996, pp. 550 to 553.*

Potamianos et al., "Spoken dialog systems for children," Proceedings of the IEEE International Conference on Acoustics, Speech and Signal Processing, vol. 1, May 1998, pp. 197 to 200.*

* cited by examiner

Primary Examiner—David Hudspeth
Assistant Examiner—Martin Lerner
(74) Attorney, Agent, or Firm—Haverstock & Owens LLP (57) ABSTRACT

A method and apparatus are used for analyzing dialogs in an interactive natural language speech recognition system. As a telephone call is received in the interactive natural language speech recognition system, user utterances are digitized and stored. A data log is formed which stores the prompt played, the dialog state, the address location of the audio recording of the user's responses, the recognition grammar, the recognition result type, the recognized word string, the understood meaning/interpretation, and the recognition latency. The telephone call can be virtually reconstructed from the stored user utterances and the data log. An automatic data analysis tool provides information regarding the relative success and failure of the various dialogs as an aid to modifying the dialogs to improve system performance.

12 Claims, 4 Drawing Sheets

METHOD OF ANALYZING DIALOGS IN A NATURAL LANGUAGE SPEECH RECOGNITION SYSTEM

FIELD OF THE INVENTION

This invention relates to the field of natural language recognition systems. More particularly, this invention relates to the field of analyzing dialog and dialog state data in a natural language recognition system.

BACKGROUND OF THE INVENTION

Interactive telephone systems are used to provide users access to a variety of services without the necessity of requiring a live operator to interface with the user. Initially such systems were of the type that played an audio message and then reacted upon sensing the user's response via entering one or more key strokes on a touch tone telephone keypad to generate well known dtmf tones. It is well recognized that such systems are not preferred for a variety of reasons including that they are cumbersome to use and further because this type of response is not natural for most users. Particularly, it is undesirable for a user to listen to a series of response choices and determine which of the 'programmed responses' is most appropriate while concurrently remembering which of the several keystrokes must be used to elicit that response.

With the advent of natural language recognition systems, users could respond to interactive telephone systems using more natural spoken responses. Such systems are used for a variety of applications. One known example is for providing information and services regarding flight availability, flight times, invoicing, payments and flight reservations and the like for a predetermined airline. Another well known use for such systems includes gaining information regarding stocks, bonds and other securities, purchasing and selling such securities, and gaining information regarding a user's stock account. Also, systems exist for controlling transactions in accounts at a bank. Other applications are also used.

Figure 1:
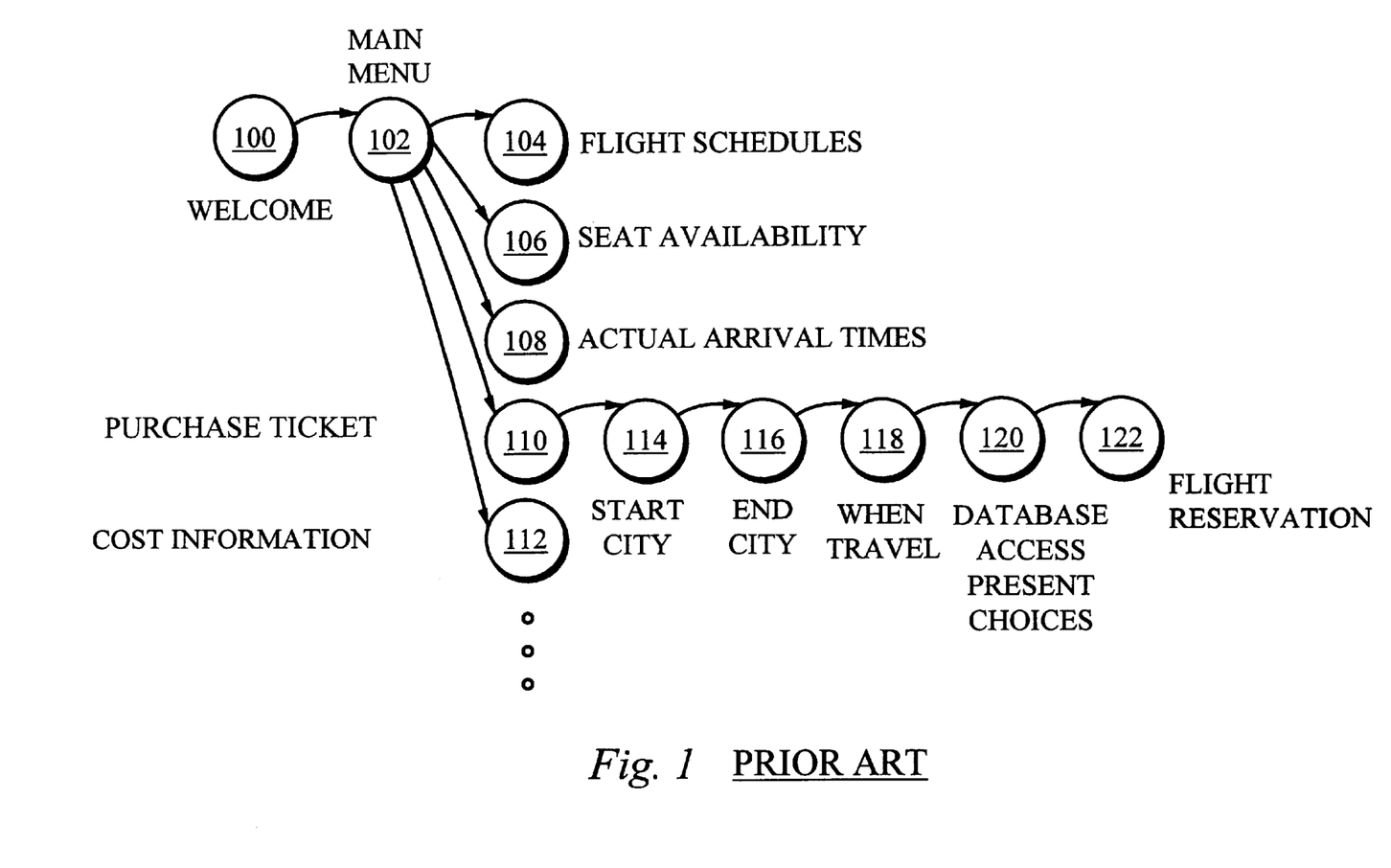
FIG. 1 shows a finite state diagram for a natural language speech recognition system.

FIG. 1 shows a finite state diagram of an exemplary prior art natural language interactive telephone system for an airline application such as that set forth above. In state 100 the application receives an incoming telephone call. This is being welcome in which the system plays a greeting to the caller during which the system identifies itself to the user. The state 102 represents the main menu of the airline interactive telephone system. During this state the system asks the user which of its several modes the user wishes to invoke. For example, the user could choose to obtain flight scheduling information in a first mode 104. Alternatively, the user could choose to learn about availability of seats for given flights in a second mode 106. Also, the user could choose to learn about actual arrival times for in-the-air flights in a third mode 108. The user can also use the system to purchase ticket in state 110. Additionally, the user could obtain information regarding the cost of flying between two cities in the state 112. Such a system could be configured to have many other modes for achieving other desired functions.

Any typical system each of the mode states 104 through 112 will cause the system to traverse through a predetermined series of states. To avoid obscuring the invention in extraneous details of which are unrelated to the principal elements of this invention, only one of the possible series of states are shown herein. In this example, a sample series of states are shown for purchasing a ticket. In the state 114 the system queries the user regarding the city in which the flight is to begin. In the state 116 the system queries of the user regarding the city in which the flight is to terminate. The system then queries the user to learn when the user wants to travel in the state 118. The state 118 will be discussed in more detail below. Upon determining these facts, the system can then access the database of flight information in the state 120 present the list of relevant flights to the user. In the state 122 the user selects a flight from among the several choices. Thereafter, the user can exit the system or return to a previously described portion of the state diagram to perform another operation.

Depending upon the complexity of the system design, the user may be required to provide each piece of information sequentially, as described in the example above, or may be allowed to provide all the pieces of information concurrently in a single dialog state transaction. Thus the finite state diagram of FIG. 1 could be shown with more or fewer number of finite states for achieving the same function. This relative system complexity is known in the art and is ancillary to the present invention.

Conventionally, a single information transaction comprising a single utterance by the system and then a single response utterance by the user is termed a 'dialog state.' Several transfers of information related to a particular topic and carried on between the system and the user via the telephone interface port is termed a 'dialog' in the state-of-the-art. Generally a dialog includes several dialog states. A telephone call includes all the dialogs and dialog states which occur between a system and a user from the time the equipment goes off-hook until it returns to an on-hook state.

According to usual practice, upon receiving a voice communication from user within a dialog state the system undertakes two principal operations in response thereto. First, the system performs a natural language speech recognition operation to determine the words that were spoken by the user. To aid in the recognition operation, the system is programmed with a predetermined set of anticipated responses. A nonsequitor response will generally be unrecognizable as "out of grammar." For example, if the system queried the user about the destination city for flight and the user responded "7 p.m. on Thursday", the system will likely not be programmed to recognize those words in the context of this dialog state. Second, the system must determine whether it 'understands' the words to be recognized in the context of the anticipated dialog state.

It will be understood by persons of ordinary skill in the art that establishing proper dialog state interactions is a demanding problem for natural language speech recognition systems. Consider for example of the main menu state 102. The system utterance could be "what do you want to do?" In response, the user could say "I need to visit my Aunt Gertrude who's sick in the hospital as soon as possible." The result of such a dialog state would not likely provide any useful information.

In the alternative, the system utterance could be "do you want to obtain flight information, flight availability, arrival times, purchase ticket, obtain cost information, or . . . ?" This system utterance is far more likely to receive a user utterance reply which it can recognize and understand. Thus, if the user replies "purchase ticket" the system will understand what the user wants to do. On the other hand, if the user replies "book a flight", "reserve a ticket", "make a reservation" or other similar utterances the system may or may not understand the user's intent. The main menu dialog can be designed to allow for recognizing and understanding a variety of user utterance replies to a specific system utterance.

Due to idiomatic nature of natural language it will be readily understood that some users will not understand a particular system utterance and similarly, some systems will not understand a particular user utterance. Generally speaking when a user fails to understand a system utterance, the user will either hang up or respond with a user utterance that the system views as nonsequitor. In either case the subject dialog state failed to produce the intended result. Consider the state 118 of FIG. 1. That example indicates that the system queries the user for when travel is desired. It may be that the system wants to know time of day, day of the week or calendar date or some combination or all of these elements. A user could easily answer with the wrong, or unexpected information. This would be viewed as a failed dialog state.

The results for dialog states fall within several categories. 1. The natural language speech recognition system can properly recognize the user's utterance. 2. The natural language speech recognition system can mis-recognize the user's utterance. 3. The system rejects the user's response for a variety of reasons, including that the user has a strong accent for which the system is not conditioned to understand, an ambient noise (eg., slamming door, passing fire engine, barking dog and the like) occurred during the utterance, or some other condition, any of which cause the system to be unable to recognize the user's utterance. 4. The user makes no utterance and the system provides a no-speech time out. 5. The user's utterance rambles excessively and the system provides a too-much speech time out. 6. The user makes an out of grammar utterance which is an utterance that the system is not programmed to expect. 7. A long recognition time out occurs where the recognizer takes too long to perform a recognition operation such as when the system is temporarily overloaded. 8. A failure is indicated where a user requests a transfer to an operator or a help expert system. 9. A failure is indicated where a user hangs up a call without achieving a successful result.

In order to properly design dialogs for a natural language speech recognition system which succeed in producing the intended result, system designers have tried a variety of approaches. In some cases, designers provide more and more alternative system and user utterances. Unfortunately, even if this approach achieves a favorable result there is no way to accurately understand this outcome. Still other designers prepare a series of dialog states and engage the services of human test subjects to attempt to use the system. The designers will study and analyze the users and their responses in order to determine the efficacy of the proposed dialogs and dialog states in a laboratory type setting. Generally, a user will attempt to access an operation system in what is termed a usability study. In the alternative, a researcher will act as the system and provide oral cues as if the researcher were indeed the system and record the user's responses to these pseudo-dialogs in a so-called 'Wizard-of-Oz System'. Such analysis is a painstaking undertaking requiring considerable effort.

Regardless of the testing approach, the user is brought to the laboratory and given a task to perform using the system prototype or using the Wizard-of-Oz System. For example, the user could be told to reserve a ticket on a flight from a specified first city to a specified second city. The researcher either records the responses in the 'Wizard-of-Oz System,' or observes the user, for example behind a two-way mirror.

Often, the designers can only study the responses of less than 50 users and often in the range of only 20 actual users. These meager results are obtained while incurring considerable expense. The amount of data actually collected is insufficient to provide meaningful results.

Further, these results may be unrealistically skewed in favor of such dialog states. This is particularly true because test subjects are less likely to hang up in frustration than an actual non-test user in a real world situation because tests subjects are motivated to properly interact with the subject system. Thus, the data does not represent real system use.

What is needed is a method of analyzing a structure of a dialog and dialog state to achieve a successful result. What is further needed is a method of analyzing a wording in each dialog and dialog state to achieve a successful result. Yet another need is a method of analyzing natural language speech recognition system dialogs in order to determine what type of dialogs and dialog states most commonly fail. What is also needed is a method of analyzing natural language speech recognition system dialogs in order to properly design and develop dialogs and dialog states which are most likely to succeed.

SUMMARY OF THE INVENTION

A method and apparatus are used for analyzing telephone calls, dialogs and dialog states in an interactive natural language speech recognition system. As a telephone call is received in the interactive natural language speech recognition system, user utterances are digitized and stored. A data log is formed which stores the prompt played, the dialog state, the address location of the audio recording of the user's responses, the recognition grammar, the recognition result type, the recognized word string, the understood meaning/interpretation, and the recognition latency. The telephone call can be virtually reconstructed from the stored user utterances and the data log. An automatic data analysis tool provides information regarding the relative success and failure of the various telephone calls, dialogs and dialog states as an aid to modifying the dialogs and dialog states to improve system performance. Performance of entire calls, dialogs and dialog states can be analyzed across many calls.

DETAILED DESCRIPTION OF THE PREFERRED EMBODIMENT

To effect the present invention, a natural language speech recognition system is placed into operation. A data analysis tool is coupled to the system to track the results of each call into the system. The data analysis tool provides a log of data regarding the various telephone calls that occur between the natural language speech recognition system and an user and inherently includes information regarding each of the dialogs and dialog states. Each of the following lists of elements is stored in the data logger for each dialog state:

the prompt played the dialog state what is the address location of the audio recording of the user's responses what was the recognition grammar what was the recognition result type*
what was the recognized word string
what was the understood meaning/interpretations
what was the recognition latency
*The result type that can be stored are:
   valid recognition
   reject
   no-speech time out
   too much speech time out
   long recognition time out
   unexpected dtmf The data log includes a collection of fields of useful information regarding each call. In relation to each call, the data log stores the prompt played by the system to the user. Relative to a finite state diagram such as the exemplary one of FIG. 1, the data log retains information regarding the particular dialog state for each interaction. A digitized version of the user's audio responses are recorded and the data log stores the address location of that audio recording. The data log stores an identification of the recognition grammar used for natural language speech recognition. The data log also stores which of the recognition result types is appropriate for each dialog state in each telephone call.

If the natural language speech recognition system determines that a valid recognition has occurred, the only way to verify that is for a human research operator to compare the user's recorded audio speech to the stored recognized word string. Based upon the recognition operation, the data log stores the recognized word string. Preferably, a research operator can listen to the stored audio recording of the user's audio responses and compare those responses to the stored recognized word string. If the research operator determines that there was a recognition error, the data log is updated to indicate that fact.

The data log also records what the natural language speech recognition system understood each dialog state to mean and thereby records its interpretation(s). There can be more than one interpretation of a user utterance. For example, in response to a system query regarding the destination city, a user could respond "Albany." If the airline serves both Albany, N.Y. and Albany, Ga., there will be two interpretations of the user's response. The natural language speech recognition system can be programmed to divert into a new set of dialog states to investigate and resolve such ambiguities.

Another data field stored in the data log is the recognition latency. This information indicates how long each recognition took for each dialog state.

The recognition result types stored in the data log for system evaluation of each dialog state in a telephone call provide a variety of useful analysis information. A valid recognition indicates that the system received a satisfactory result to a system utterance which was recognized and understood. When the natural language speech recognition system fails to recognize a user utterance, the data log reflects that the recognition result type is a reject.

If the user fails to speak at all within a predetermined time after and in response to a system utterance the data log reflects a no-speech time out. Conversely, if the user begins speaking and rambles on for an extended period, the data log reflects a too much speech time out. The natural language speech recognition system is programmed to expect a particular amount of user utterances in response to system utterances. In those cases where there the user utterance exceed such parameters, it is presumed that the user has failed to understand the system utterance and is accordingly providing a non-responsive answer.

If the natural language speech recognition system takes longer than a predetermined amount of time to complete processing of a user utterance the data log records a long recognition time out. This avoids having the user wait on the telephone for an unacceptable delay.

The user can also provide utterances or responses which indicate their frustration with the system or failure to properly use the system. Finally, if the user presses the telephone keypad accidently or mistakenly, the data log will record an unexpected dtmf.

Figure 2:
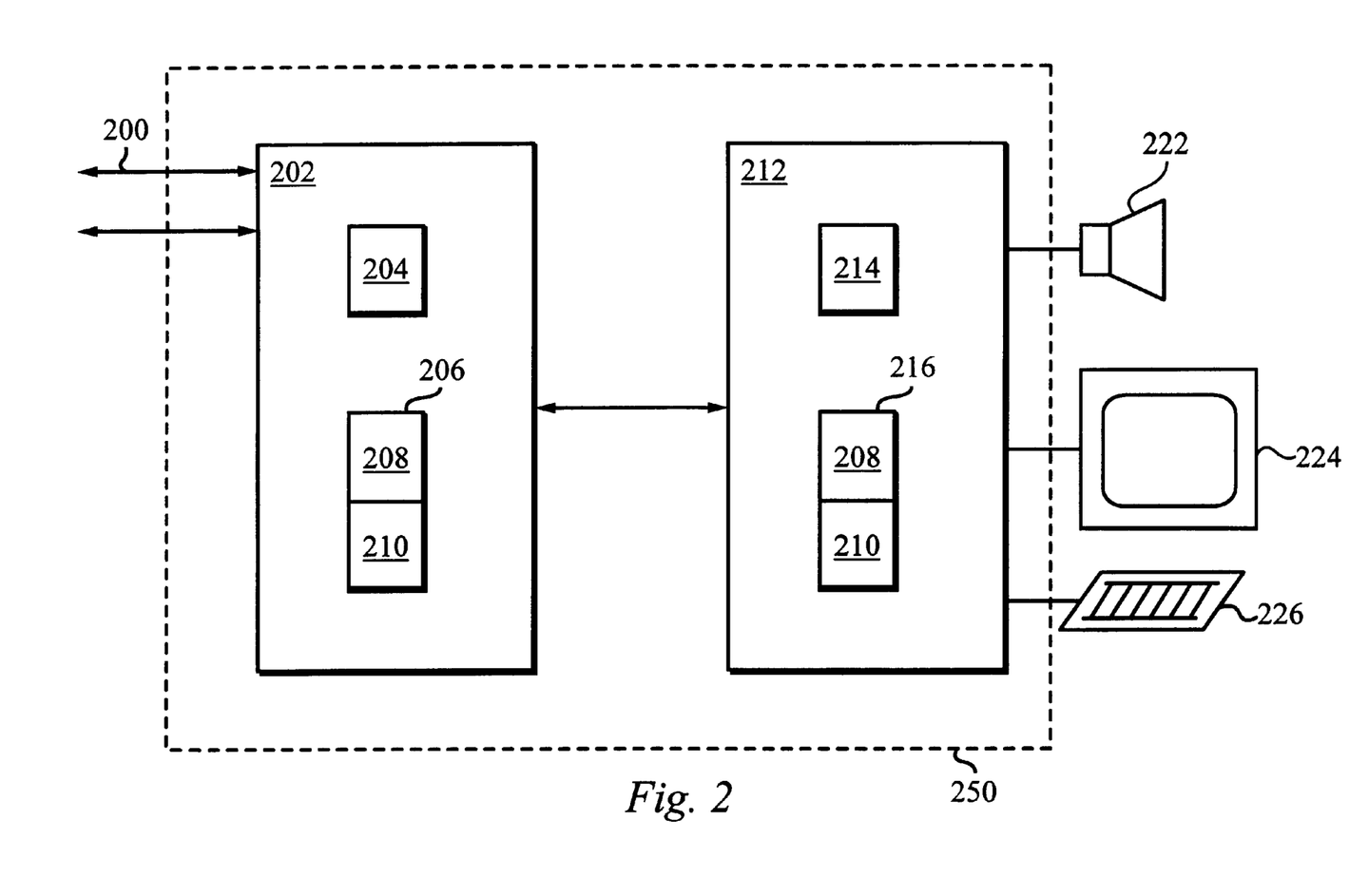
FIG. 2 shows a block diagram of a natural language speech recognition system according to the present invention.

A block diagram for an exemplary system for implementing the present invention is shown in FIG. 2. An incoming trunk line 200 is coupled to a natural language speech recognition system 202. The natural language speech recognition system 202 is configured as both a natural language speech recognition device for recognizing spoken words and as interpreter for generating understanding of a dialog state and includes a processor 204 and a memory 206. The memory is partitioned into a program memory 208 and a dialog memory 210. Depending upon the particular application, the program memory 208 and the dialog memory 210 may be of different sizes, one from the other.

A data analysis tool 212 is operatively coupled to the natural language speech recognition system 202. The data analysis tool includes a processor 214 and a memory 216. The memory 216 is partitioned into digitized audio data 218 and also the data log 220 which includes the results of the data analysis tool 212 analyzing the various dialogs and dialog states. The data analysis tool 212 also includes an audio output 222 from which an operator can listen to the audio data for determining whether a recognition error occurred. The data analysis tool 212 also includes a display 224 for presenting analyzed data and a data entry device, such as a keyboard 226 to allow an operator to enter error recognition data.

It will be apparent to one of ordinary skill in the art that the natural language speech recognition system 202 and the data analysis tool 212 can be formed of a single computer. In that case, the processor 204 and the processor 214 are likely to be a single processor such as an integrated circuit microprocessor. Also, the memories 206 and 216 will be a single storage device partitioned in the four portions of memory 208, 210, 218 and 220 already described.

The dialog design method utilizes the stored audio interaction, a transcription of the stored audio interaction and data logger file. The transcription is compared to the data logger file of the recognized word string to determine whether there was a mis-recognition. An indication of whether or not there was a mis-recognition is stored in the data logger database by the human operator.

This data is stored for every telephone call, and every utterance of every dialog state. A software data analysis tool is then used to analyze the data in any of a variety of predetermined ways. Each call from a single user to the system can be compared to every other call to determine the worst single call. All calls can be rated and ranked according to any of a variety of criteria.

Calls can be reconstructed from the data log and virtually played back for an analyst who can use the information to determine the cause of the problem and ascertain whether or not to modify the dialogs or dialog states. The system's prompts are listed in the data log and from that information can be played to the researcher. The user's audio responses to the prompts are digitized and stored and can be played back directly upon conversion to analog from digital. In this way, the amount of stored data is substantially reduced from having to store the audio record of both sides of all calls.

The data analysis tool can be used to determine a variety of information regarding the telephone calls, dialogs and dialog states, either individually or collectively across the entire database. Once the data log is formed in a database, the database can be queried using any conventional query tool, such as SQL, or a proprietary query tool. The researcher can query the database for any arbitrary set or subset of telephone calls, dialogs or dialog states based upon a individual field or combination of fields from the data log. This technique is commonly called filtering the data. The filtered data can be presented as either an actual count of the number of times or as a percentage.

In one example, the data analysis tool can analyze the database to determine which single dialog state provides the greatest number of failures over the entire population of telephone calls for the interactive natural language speech recognition system. That dialog state can be reconstructed and played back for an analyst who can use the information to determine the cause of the problem and ascertain whether or not to modify that dialog state.

Similarly, the data analysis tool can be used to determine which of the various dialog states provide a number of failures over a predetermined threshold of failures for the interactive natural language speech recognition system. Those dialogs or dialog states that exceed the threshold number of failures can be reconstructed and played back for an analyst who can use the information to determine the cause of the problem and ascertain whether or not to modify those dialog states.

There are many examples of information the data analysis tool can provide. For example, the data analysis tool can determine and show all calls with greater than a predetermined percentage of the dialog states returning a predetermined single (or combination) of recognition result type, such as reject or no speech time out. The data analysis tool can determine and show all calls dialog states which have a greater than a predetermined percentage of recognized word strings, or interpretations, such as request for help or transfer request.

The data analysis tool can show the hang up rate across all calls or across all dialog states. Or, the data analysis tool can show the out-of-grammar rate across all calls or dialog states. It will be apparent that any of the data analysis tool can be used to filter for any of the recognition result types discussed herein.

A research analyst can use this information to play back the calls or dialog states of interest. In other words, the research analyst can listen to those complete calls that have the most number of negative recognition result types. The research analyst can also choose to listen to all dialog states across all the calls in which there was a negative recognition result type. The research analyst could choose to listen to a predetermined number of such calls or dialog states.

The data analysis tool can provide a graphical user interface (GUI). For example, the GUI can display to a finite state diagram (such as FIG. 1) to the research analyst. Such a graphical representation of the various dialogs available within a natural language speech recognition system is useful in helping a research analyst to understand a failure mode.

As another alternative use of this data analysis tool, two or more interactive natural language speech recognition systems can be concurrently installed and operating. It will be understood that the two 'systems' can operate in a single physical system which alternately uses the different dialogs at a predetermined ratio to each other. These multiple interactive natural language speech recognition systems can be nearly identical but have one or more dialog states which are different from one to the other. The data analysis tool can then be used to determine whether one or the other of the 'competing' dialog states achieves a fewer percentage of failures as an aid to improving dialog performance.

Figure 3:
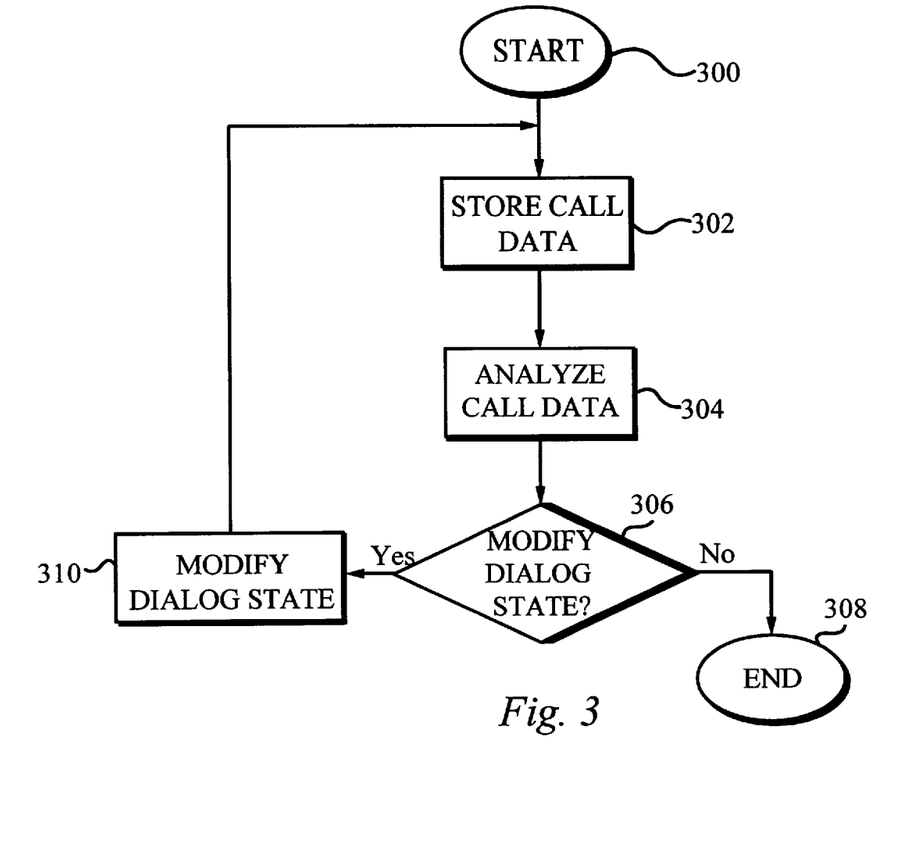
FIG. 3 shows a flow chart for the method of the present invention.

FIG. 3 shows a flow chart of a data analysis process according to the present invention. In the initial block 300, a telephone call to the natural language speech recognition system occurs. Data regarding the one or more dialog states from that telephone call are prepared and stored in a data log for each of the dialog states in the block 302. A dialog design researcher queries the data log with machine queries constructed to learn a particular failure mode in the step 304. The dialog design researcher determines whether modification to the dialog is appropriate in the step 306. If no modification is required the method ends in the conclusion block 308. If modification is required, that dialog state is modified in the step 310. Upon modification, the process repeats itself to determine whether the modification improved the performance of the natural language speech recognition system.

Figure 4:
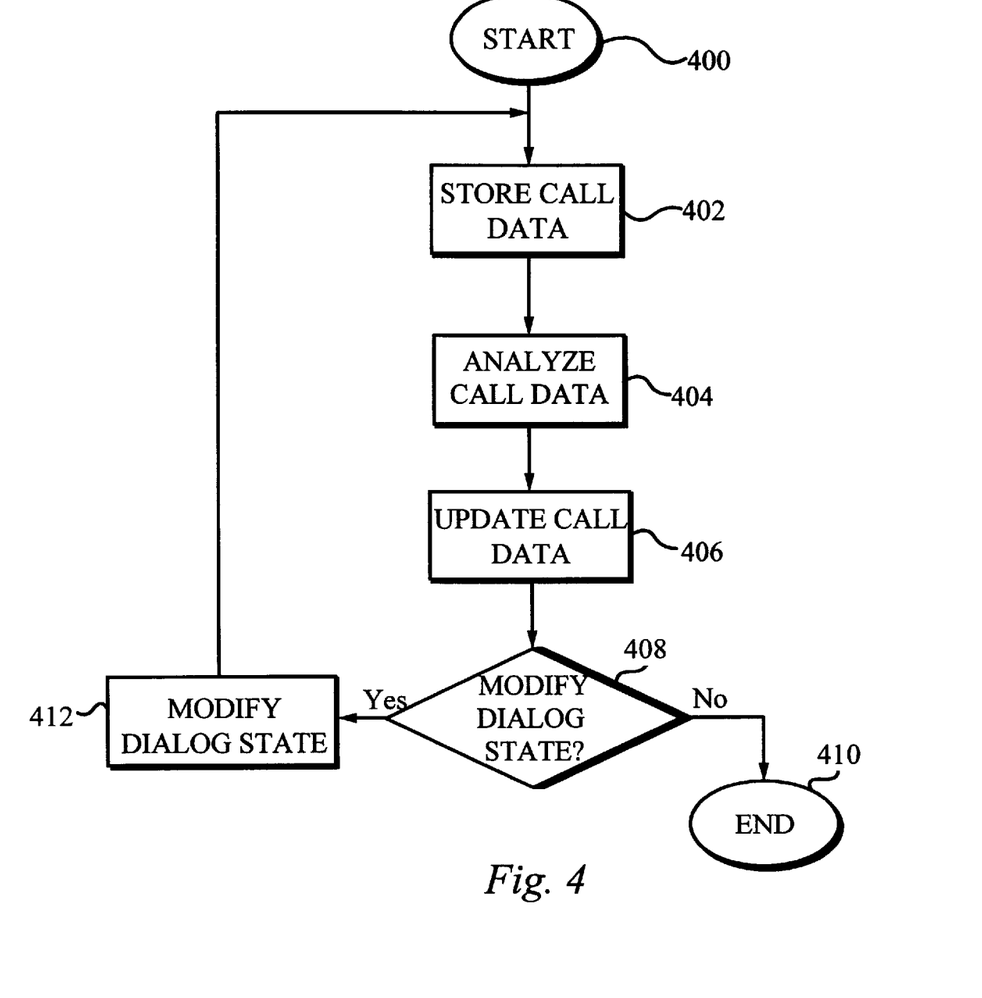
FIG. 4 shows a flow chart for the method of the preferred embodiment of present invention.

FIG. 4 shows a flow chart of the preferred data analysis process according to the present invention. In the initial block 400, a telephone call to the natural language speech recognition system occurs. Data regarding the one or more dialog states from that telephone call are prepared and stored in a data log for each of the dialog states in the block 402. A dialog design researcher queries the data log with machine queries constructed to learn a particular failure mode in the step 404. A research operator determines whether a recognition error occurred and updates the data log in the step 406. The dialog design researcher determines whether modification to the dialog state is appropriate in the step 408. If no modification is required the method ends in the conclusion block 410. If modification is required, that dialog state is modified in the step 412. Upon modification, the process repeats itself to determine whether the modification improved the performance of the natural language speech recognition system.

The discussions relative to FIG. 3 and FIG. 4 appear to indicate that the analysis is performed upon single telephone calls as they are received. Such a procedure would provide little advantage owing to the nominal statistical significance of a single telephone call. It will be understood by persons of ordinary skill in the art that analysis and resultant changes to the system, will preferably be performed on data from a large number of telephone calls, rather than based upon a single telephone call one at a time.

A prototype of the present invention has been used to verify the operation and utility of the technology disclosed herein. It has been experienced that the data analysis tool in not only useful in analyzing efficacy of dialog states. By identifying particular timeout modes in an analysis of recognition result type, the data analysis tool has been used to identify defects in the hardware upon which the software of the present invention operates. As such, the present invention is clearly a system analysis tool though its intent was as a dialog state analysis tool.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A dialog design system for a natural language speech recognition system comprising:
   a. a data input for receiving one or more telephone calls from one or more respective users, each telephone call including one or more dialogs;
   b. a natural language speech recognition device for recognizing words in the dialogs;
   c. a dialog interpreter for interpreting the words;
   d. means for storing a digitized audio recording of a user utterance forming stored user utterances;
   e. a data logger for generating a table of data regarding each of the dialogs; and
   f. a data analysis tool coupled to receive one or more tables of data from the one or more respective telephone calls for automatically analyzing the tables of data in response to a selected criterion.

2. The dialog design system according to claim 1 wherein the data analysis tool analyzes the one or more tables of data and provides a result on a dialog state by dialog state basis.

3. The dialog design system according to claim 1 wherein the data analysis tool analyzes the one or more tables of data and provides a result on a telephone call basis.

4. The dialog design system according to claim 1 further comprising means for automatically reconstructing a telephone call from the table of data and the stored user utterances.

5. The dialog design system according to claim 4 further comprising means for updating the table of data in response to a played back telephone call.

6. The dialog design system according to claim 1 further comprising means for automatically reconstructing a dialog state from the table of data and the stored user utterances.

7. The dialog design system according to claim 6 further comprising means for updating the table of data in response to a played back telephone call.

8. A method of designing dialogs for a natural language speech recognition system comprising the steps of:
   a. receiving one or more telephone calls, each telephone call having a plurality of dialogs, each dialog including a system generated utterance and a user response utterance;
   b. storing only each user response utterance forming a stored user utterance; and
   c. generating a data log for each dialog including an identifier for the system generated utterance and an indicator regarding success of the dialog.

9. The method according to claim 8 further comprising the step of using a processor to automatically analyze one or more data logs according to a selected criterion.

10. The method according to claim 8 further comprising the steps of:
    a. automatically reconstructing one or more telephone calls from the respective stored user utterance and the respective data logs of each telephone call; and
    b. using a processor to automatically analyze the one or more data logs according to a selected criterion.

11. The method according to claim 8 further comprising the steps of:
    a. automatically reconstructing and replaying one or more telephone calls from the respective stored user utterance and the respective data logs of each telephone call;
    b. manually updating the one or more data logs in response to the one or more replayed telephone calls; and
    c. using a processor to automatically analyze the one or more data logs according to a selected criterion.

12. The method according to claim 8 further comprising the steps of:
    a. automatically reconstructing and replaying one or more telephone calls from the respective stored user utterance and the respective data logs of each telephone call;
    b. manually updating the one or more data logs in response to the one or more replayed telephone calls;
    c. using a processor to automatically analyze the one or more data logs according to a selected criterion for forming an analysis output; and
    d. modifying a dialog in response to the analysis output.

* * * * *

UNITED STATES PATENT AND TRADEMARK OFFICE
CERTIFICATE OF CORRECTION

PATENT NO. : 6,219,643 B1  Page 1 of 1
DATED : April 17, 2001
INVENTOR(S) : Cohen et al.

It is certified that error appears in the above-identified patent and that said Letters Patent is hereby corrected as shown below:

Column 6,
Lines 6-8, delete the sentence beginning with the words "The user" on line 6 through the words "the system." on line 8.

Signed and Sealed this

Twenty-fifth Day of December, 2001

Attest:

Attesting Officer

JAMES E. ROGAN
Director of the United States Patent and Trademark Office